(12) United States Patent
Ravaglia

(10) Patent No.: US 10,889,395 B2
(45) Date of Patent: Jan. 12, 2021

(54) APPARATUS FOR PROCESSING BALES, FOR AGRICULTURAL MACHINES

(71) Applicant: KVERNELAND GROUP RAVENNA S.R.L., Russi (IT)

(72) Inventor: Paolo Ravaglia, Bagnacavallo (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 405 days.

(21) Appl. No.: 15/853,276

(22) Filed: Dec. 22, 2017

(65) Prior Publication Data
US 2018/0178933 A1   Jun. 28, 2018

Related U.S. Application Data

(63) Continuation of application No. 14/445,509, filed on Jul. 29, 2014, now Pat. No. 9,926,090.

(30) Foreign Application Priority Data

Aug. 5, 2013 (EP) ..................... 13425111

(51) Int. Cl.
| | |
|---|---|
| B65B 13/02 | (2006.01) |
| B65B 63/02 | (2006.01) |
| A01F 15/07 | (2006.01) |

(52) U.S. Cl.
CPC .......... B65B 13/02 (2013.01); A01F 15/0715 (2013.01); B65B 63/02 (2013.01); *A01F 2015/072* (2013.01)

(58) Field of Classification Search
CPC ......... B65B 11/00; B65B 11/04; B65B 59/04; B65B 65/02; B65B 65/04; A01F 15/07; A01F 15/071; A01F 15/0715; A01F 15/08

(Continued)

(56) References Cited

U.S. PATENT DOCUMENTS

| | | | | |
|---|---|---|---|---|
| 2,877,120 A | * | 3/1959 | Bush ........................ | B26D 7/27 426/420 |
| 4,599,844 A | * | 7/1986 | Clostermeyer ..... | A01F 15/0715 53/118 |

(Continued)

FOREIGN PATENT DOCUMENTS

| | | |
|---|---|---|
| EP | 0807380 A1 | 11/1997 |
| WO | 2005009112 A2 | 2/2005 |

OTHER PUBLICATIONS

European Search Report dated Jan. 9, 2014 for European Application No. EP13425111.5 filed Aug. 5, 2013, 2 pages.

*Primary Examiner* — Dariush Seif
(74) *Attorney, Agent, or Firm* — Pearne & Gordon LLP

(57) ABSTRACT

An apparatus for processing bales, for agricultural machines provided with a chamber for forming a substantially cylindrical bale. The apparatus includes at least one structure for supporting a reel of banded material, of the type of a net, a polymeric film, and the like, designed to wrap the bale. The apparatus includes means of movement of a device for the transfer and delivery of an end flap of the reel to the forming chamber; such device is provided with an end blade which can move along a work path, from a first limit position, in which the blade is proximate to the reel supported by the structure, for the withdrawal of the end flap, to a second limit position, in which the blade is facing toward the chamber, for the delivery of the flap to the chamber, and vice versa, such limit positions having substantially the same height from the ground.

19 Claims, 12 Drawing Sheets

(58) Field of Classification Search
USPC ... 53/397, 399, 587, 588, 389.2–389.4, 393, 53/409, 430, 118, 116, 203, 204, 210, 53/211, 216; 493/340, 370; 83/352
See application file for complete search history.

(56) References Cited

U.S. PATENT DOCUMENTS

| | | | | |
|---|---|---|---|---|
| 4,697,402 A * | 10/1987 | Anstey | A01F 15/0715 | 53/506 |
| 4,802,395 A * | 2/1989 | Merritt, III | A01F 15/0715 | 56/341 |
| 4,956,968 A * | 9/1990 | Underhill | A01F 15/0715 | 100/88 |
| 5,109,652 A * | 5/1992 | Viaud | A01F 15/0715 | 53/505 |
| 5,216,873 A * | 6/1993 | Ratzlaff | A01F 15/0715 | 53/118 |
| 5,243,806 A * | 9/1993 | Jennings | A01F 15/0715 | 53/118 |
| 5,259,167 A * | 11/1993 | Underhill | A01F 15/0715 | 53/118 |
| 5,289,672 A * | 3/1994 | Underhill | A01F 15/0715 | 53/389.3 |
| 5,317,858 A * | 6/1994 | Hanai | B29C 66/83543 | 53/389.2 |
| 5,319,899 A * | 6/1994 | Jennings | A01F 15/0715 | 53/118 |
| 5,327,821 A * | 7/1994 | McClure | A01F 15/141 | 100/5 |
| 5,448,873 A * | 9/1995 | Jennings | A01F 15/0715 | 53/118 |
| 5,450,704 A * | 9/1995 | Clostermeyer | A01F 15/07 | 100/5 |
| 5,479,767 A * | 1/1996 | McClure | A01F 15/07 | 100/15 |
| 5,557,906 A * | 9/1996 | Viaud | A01F 15/0715 | 53/118 |
| 5,581,973 A * | 12/1996 | Underhill | A01F 15/0715 | 53/118 |
| 5,581,974 A * | 12/1996 | Underhill | A01F 15/0715 | 53/118 |
| 5,581,976 A * | 12/1996 | Underhill | A01F 15/0715 | 53/399 |
| 5,855,109 A * | 1/1999 | Vande Ryse | A01D 89/004 | 100/88 |
| 5,916,116 A | 6/1999 | Vande Ryse et al. | | |
| 6,164,050 A * | 12/2000 | Vande Ryse | A01D 89/004 | 100/88 |
| 6,209,450 B1 * | 4/2001 | Naaktgeboren | A01F 15/141 | 100/4 |
| 6,446,548 B2 * | 9/2002 | Chow | A01F 15/141 | 100/13 |
| 6,722,100 B1 * | 4/2004 | Underhill | A01F 15/0715 | 53/118 |
| 6,774,805 B1 * | 8/2004 | Viesselmann | A01F 15/0715 | 340/675 |
| 6,886,307 B2 * | 5/2005 | Viaud | A01F 15/0715 | 53/118 |
| 6,981,352 B2 * | 1/2006 | Chow | A01F 15/0715 | 53/118 |
| 7,181,900 B2 * | 2/2007 | Hood | A01F 15/0715 | 100/88 |
| 7,322,167 B2 * | 1/2008 | Chapon | A01F 15/0715 | 53/118 |
| 7,334,382 B2 * | 2/2008 | Smith | A01F 15/0715 | 242/555.3 |
| 7,513,088 B2 * | 4/2009 | Vande Ryse | A01F 15/0715 | 53/118 |
| 7,644,563 B2 * | 1/2010 | De Gersem | A01F 15/0715 | 53/118 |
| 7,918,072 B2 * | 4/2011 | McClure | A01F 15/0715 | 100/15 |
| 8,490,366 B1 * | 7/2013 | Hintz | A01F 15/0715 | 242/422.4 |
| 8,601,770 B2 * | 12/2013 | Paillet | A01F 15/0715 | 53/211 |
| 8,656,686 B2 * | 2/2014 | Smith | A01F 15/0715 | 53/216 |
| 9,415,888 B2 * | 8/2016 | Smith | A01F 15/0715 | |
| 9,474,212 B2 * | 10/2016 | Paillet | A01F 15/0715 | |
| 2004/0016204 A1 * | 1/2004 | Chow | A01F 15/0715 | 53/67 |
| 2006/0242931 A1 * | 11/2006 | Ryse | A01F 15/0715 | 53/587 |
| 2007/0157556 A1 * | 7/2007 | Feraboli | A01F 15/0715 | 53/399 |
| 2008/0022649 A1 * | 1/2008 | De Gersem | A01F 15/0715 | 56/341 |
| 2009/0094948 A1 * | 4/2009 | Viaud | A01F 15/0715 | 53/587 |
| 2009/0272072 A1 * | 11/2009 | Paillet | A01F 15/0715 | 53/118 |
| 2010/0192516 A1 * | 8/2010 | Olander | A01F 15/0715 | 53/399 |
| 2011/0179750 A1 * | 7/2011 | Smith | A01F 15/0715 | 53/399 |
| 2012/0073455 A1 * | 3/2012 | Vandamme | B65B 27/125 | 100/35 |
| 2012/0233962 A1 * | 9/2012 | Bennett | A01F 15/0715 | 53/203 |
| 2012/0240516 A1 * | 9/2012 | Chapon | A01F 15/0715 | 53/203 |
| 2014/0075887 A1 * | 3/2014 | Akpan | B65B 5/04 | 53/430 |
| 2015/0033666 A1 * | 2/2015 | Ravaglia | B65B 63/02 | 53/137.2 |
| 2015/0305244 A1 * | 10/2015 | Gresset | A01F 15/0715 | 53/587 |

\* cited by examiner

APPARATUS FOR PROCESSING BALES, FOR AGRICULTURAL MACHINES

CROSS-REFERENCE TO RELATED APPLICATIONS

This application claims priority to European Patent Application No. EP 13425111.5 filed on Aug. 5, 2013, the disclosure of which is hereby incorporated in its entirety by reference herein.

The present invention relates to an apparatus for processing bales, for agricultural machines.

BACKGROUND

As is known, the terms "baling machine" or "forage press" are commonly used to indicate agricultural machines designed for collecting and compressing agricultural products such as forage or straw, in bales of various shapes and sizes.

The agricultural products thus compressed, having an appreciably lower volume, are more manageable, and this enables their easier transport and more convenient storage, and more generally a simple management, for various purposes.

Among the various different types of machine that are covered by the above mentioned category, a role of undoubted importance is occupied by "round balers", which produce cylindrical bales.

To ensure the maintenance of the configuration assumed by the agricultural products, and thus prevent the bale that has just been made from breaking up, balers are equipped with devices for wrapping and tying, which are capable of wrapping the bale with a polymeric film or a net and of tying it with twine.

More specifically, with regard to the wrapping, according to conventional methods round balers are provided at the front with a reel of film or net, arranged parallel to the ground and perpendicular to the advancement direction, from which an end flap of the material designed to wrap the bale is progressively unwound.

Precisely in order to unwind the flap, and bring it proximate to the bale that has just been formed (which is usually inside a specially adapted and equipped chamber, defined in the main body of the baler), in front of and parallel to the reel there is a rubberized roller, on the at least partially elastically deformable outer surface of which a counter-roller can abut, so as to be able to tension the flap of net or film, and, following the rotation of the roller, determine the unwinding thereof and the sending to the chamber.

At the chamber, the high centrifugal forces to which the flap is subjected, as a consequence of the rotation speed of the bale, determine the automatic wrapping of the bale.

Such implementation solution is not however devoid of drawbacks.

The need to have a roller (and a respective counter-roller, or another device capable of abutting against the roller, so as to ensure the tightening and unwinding of the flap), determines first of all an increase in encumbrances, which, when designing and dimensioning the machine, complicates the placement of the elements used for the tying operations with twine.

Furthermore, by virtue of the pressure exerted by the counter-roller, over time the roller tends to deform locally, thus compromising the optimal operation of the apparatus, and thus the correct wrapping of the bale.

Finally, it must be noted that the roller, and the other elements associated with it, determines significant increases in cost and structural complexity.

SUMMARY

The aim of the present invention is to solve the above mentioned problems, by providing an apparatus that is capable of ensuring a practical and effective wrapping of the bale.

Within this aim, an object of the invention is to provide an apparatus that is capable of wrapping the bale with an ergonomic solution, of practical use for the operator.

Another object of the invention is to provide a wrapping apparatus, optionally provided with elements adapted to the tying of the bale using twine, which in any case keeps encumbrances low.

A further object of the invention is to provide a bale wrapping apparatus that ensures constant control and the braking, where necessary, of the reel of film or net being progressively unwound.

A further object of the invention is to provide a wrapping apparatus that ensures a high reliability of operation, even in the presence of wind.

Another object of the invention is to provide a wrapping apparatus that can be easily implemented using elements and materials that are readily available on the market.

Another object of the invention is to provide a bale wrapping apparatus that is low cost and safely applied.

This aim and these objects are achieved by an apparatus for processing bales, for agricultural machines provided with a chamber for forming a substantially cylindrical bale, which comprises at least one structure for supporting a reel of banded material, of the type of a net, a polymeric film, and the like, designed to wrap the bale, characterized in that it comprises means of movement of a device for the transfer and delivery of an end flap of the reel to the forming chamber, the device being provided with an end blade which can move along a work path, from a first limit position, in which the blade is proximate to the reel supported by the structure, for the withdrawal of the end flap, to a second limit position, in which the blade is facing toward the chamber, for the delivery of the flap to the chamber, and vice versa, the limit positions having substantially the same height from the ground.

BRIEF DESCRIPTION OF THE DRAWINGS

Further characteristics and advantages of the invention will become better apparent from the description of a preferred, but not exclusive, embodiment of the apparatus according to the invention, which is illustrated by way of non-limiting example in the accompanying drawings wherein.

DETAILED DESCRIPTION

Figure 1:
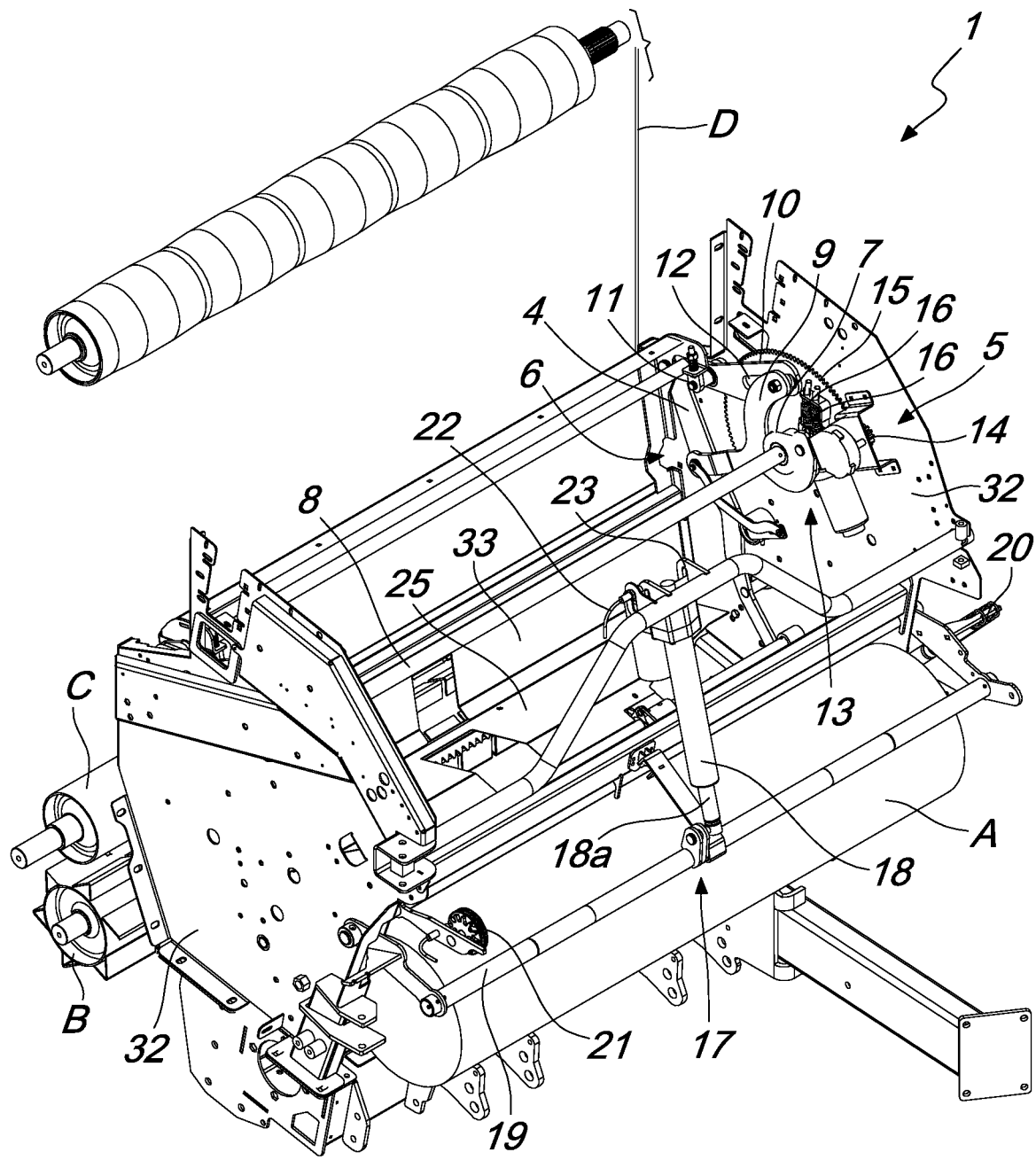
FIG. 1 is a left-hand perspective front schematic view of the apparatus according to the invention, in the first limit position of the transfer and delivery device.
Figure 2:
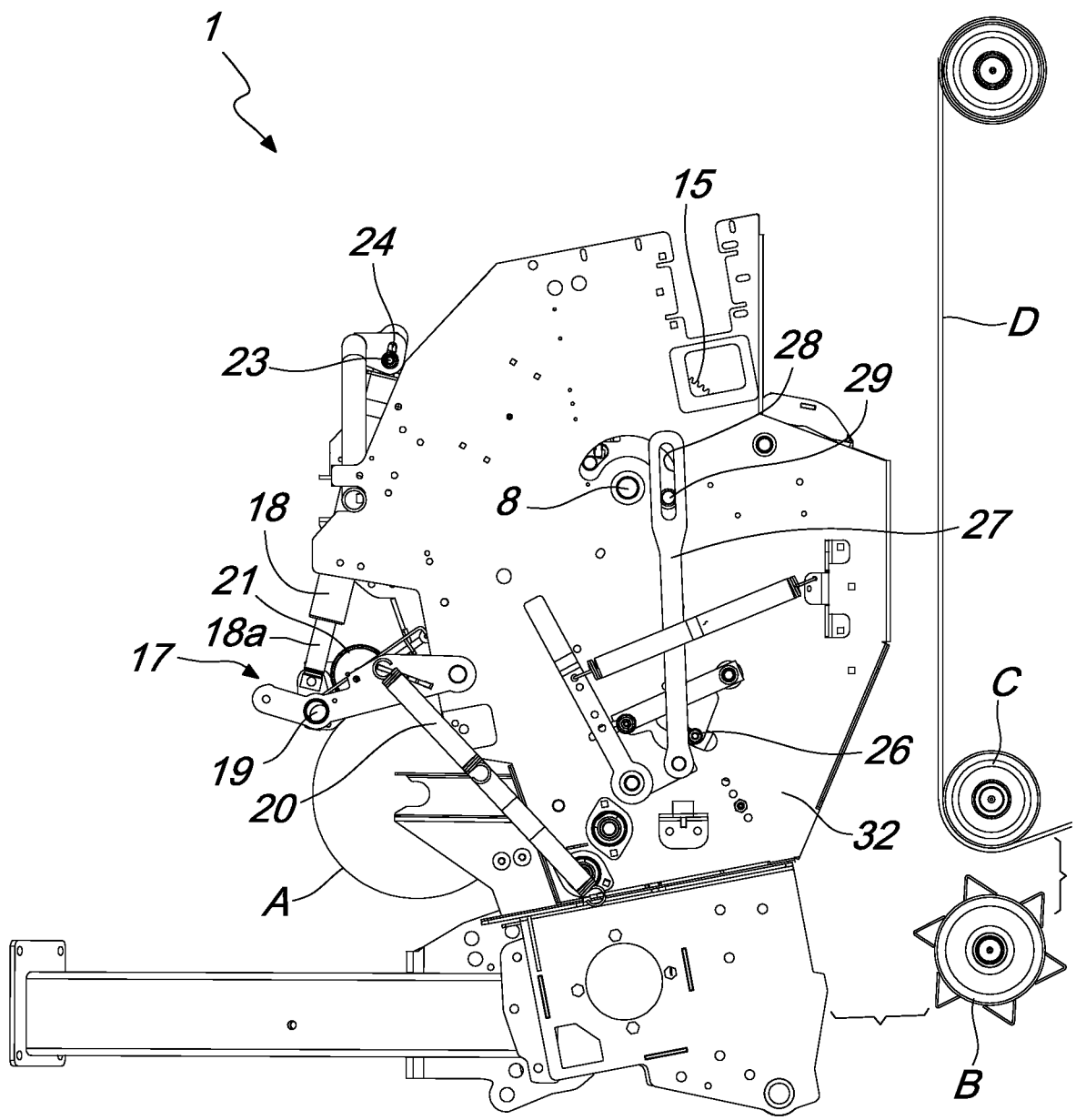
FIG. 2 is a side schematic view of the apparatus in FIG. 1.
Figure 3:
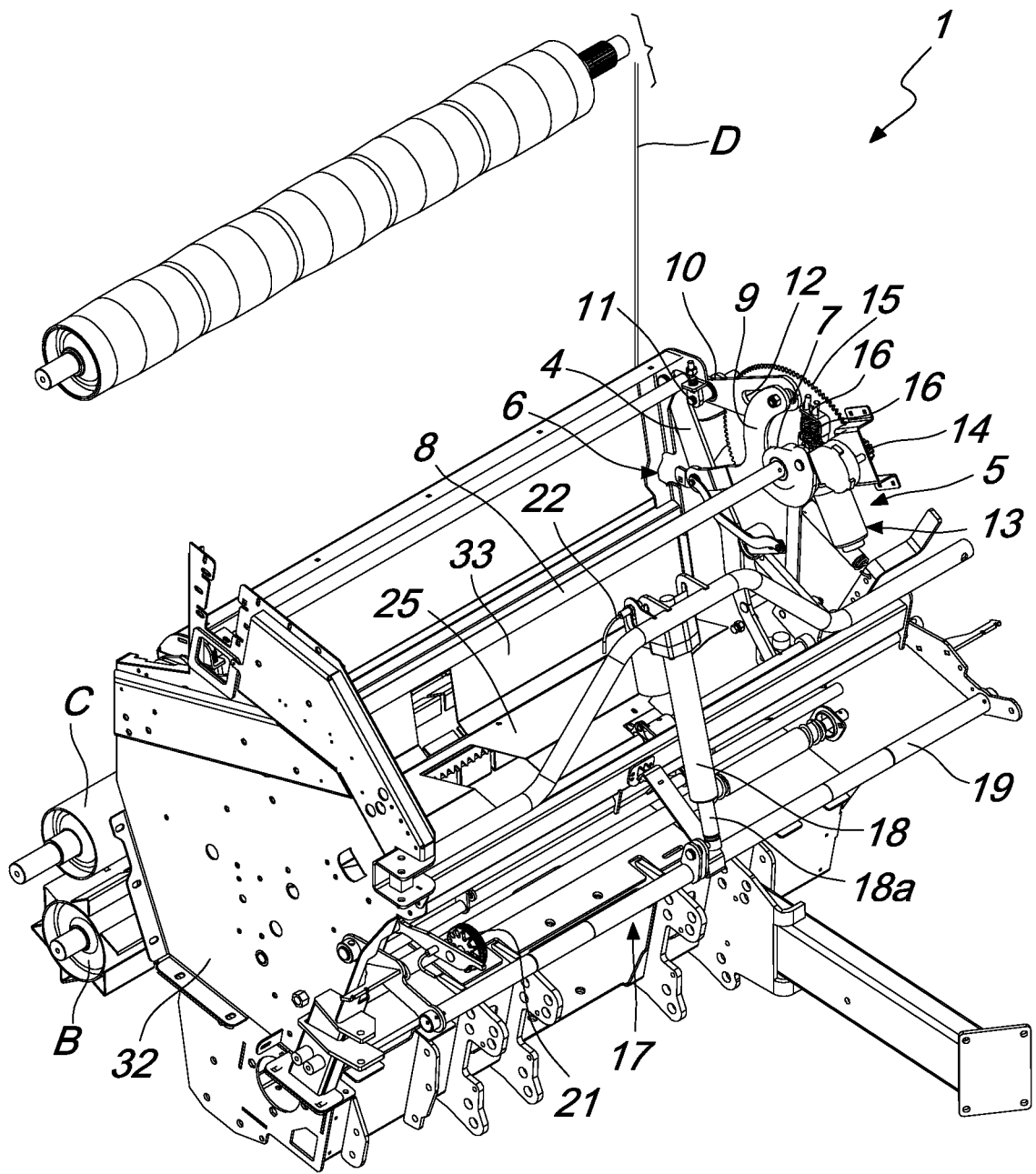
FIG. 3 is a left-hand perspective front schematic view of the apparatus according to the invention, in the first limit position of the transfer and delivery device, with the bale and a first covering element both removed.

With reference to the figures, the reference numeral 1 generally designates an apparatus for processing bales, for agricultural machines provided with a chamber for forming a substantially cylindrical bale, and, more precisely, in the preferred application, intended to be installed and used on balers, round balers and the like, designed for the collection of agricultural products such as hay, straw and forage, and for the subsequent sending thereof to the aforementioned chamber, which is usually provided in the casing of the machine itself.

It should be made clear from this point onward that the possibility is not ruled out of using the apparatus 1 according to the invention in other areas, and with other types of agricultural machines, according to specific requirements, and it should also be made clear that the apparatus 1 can be installed both on self-propelled agricultural machines and on agricultural machines drawn by a tractor or other motorized vehicle.

The apparatus 1 comprises in any case at least one structure (be it a cylindrical core, or other structure) for supporting a reel A of banded material, of the type of a net, of a polymeric film, and the like, which is designed to wrap the bale.

Figure 4:
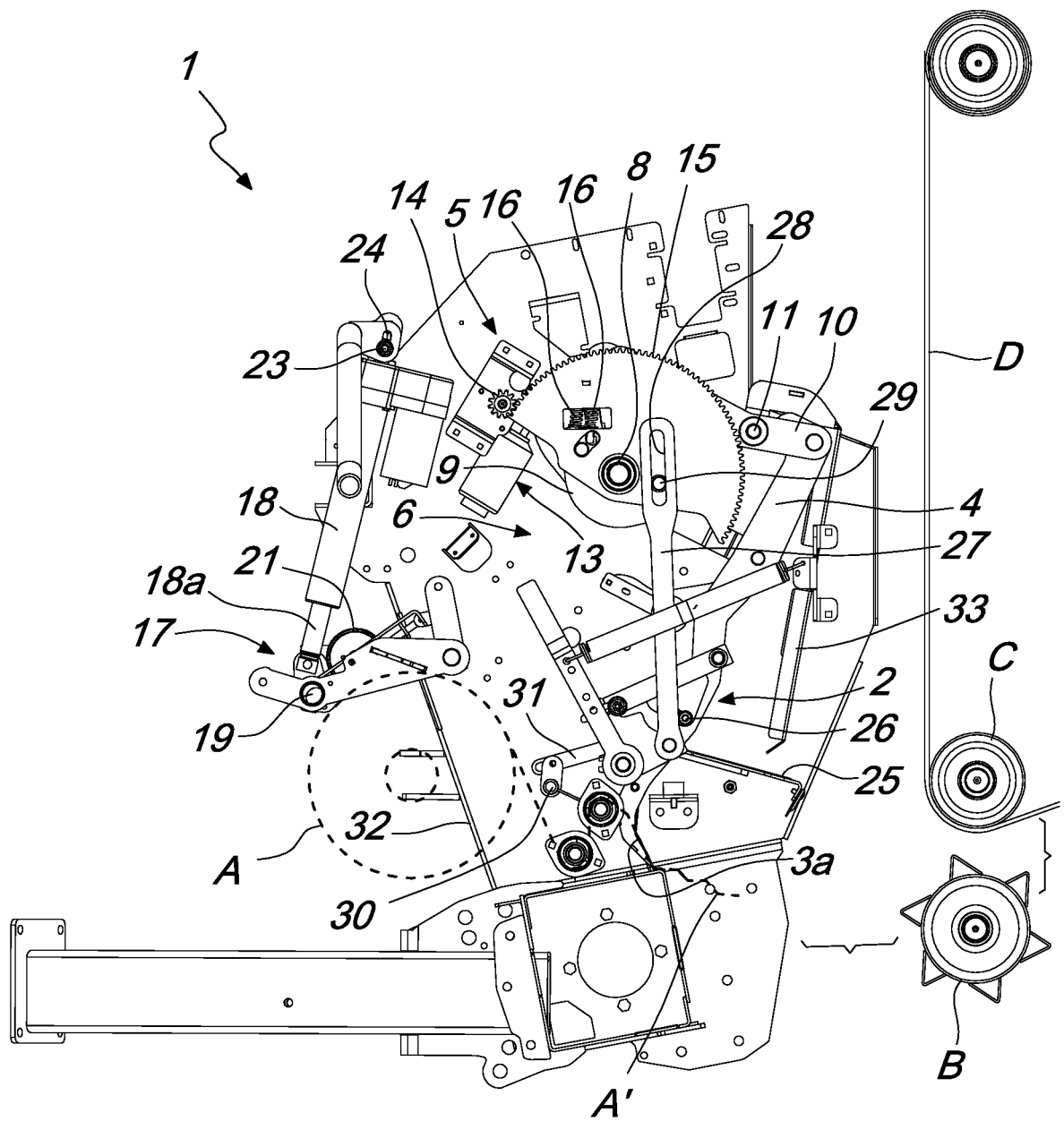
FIG. 4 is a side schematic view of the apparatus in FIG. 3.
Figure 5:
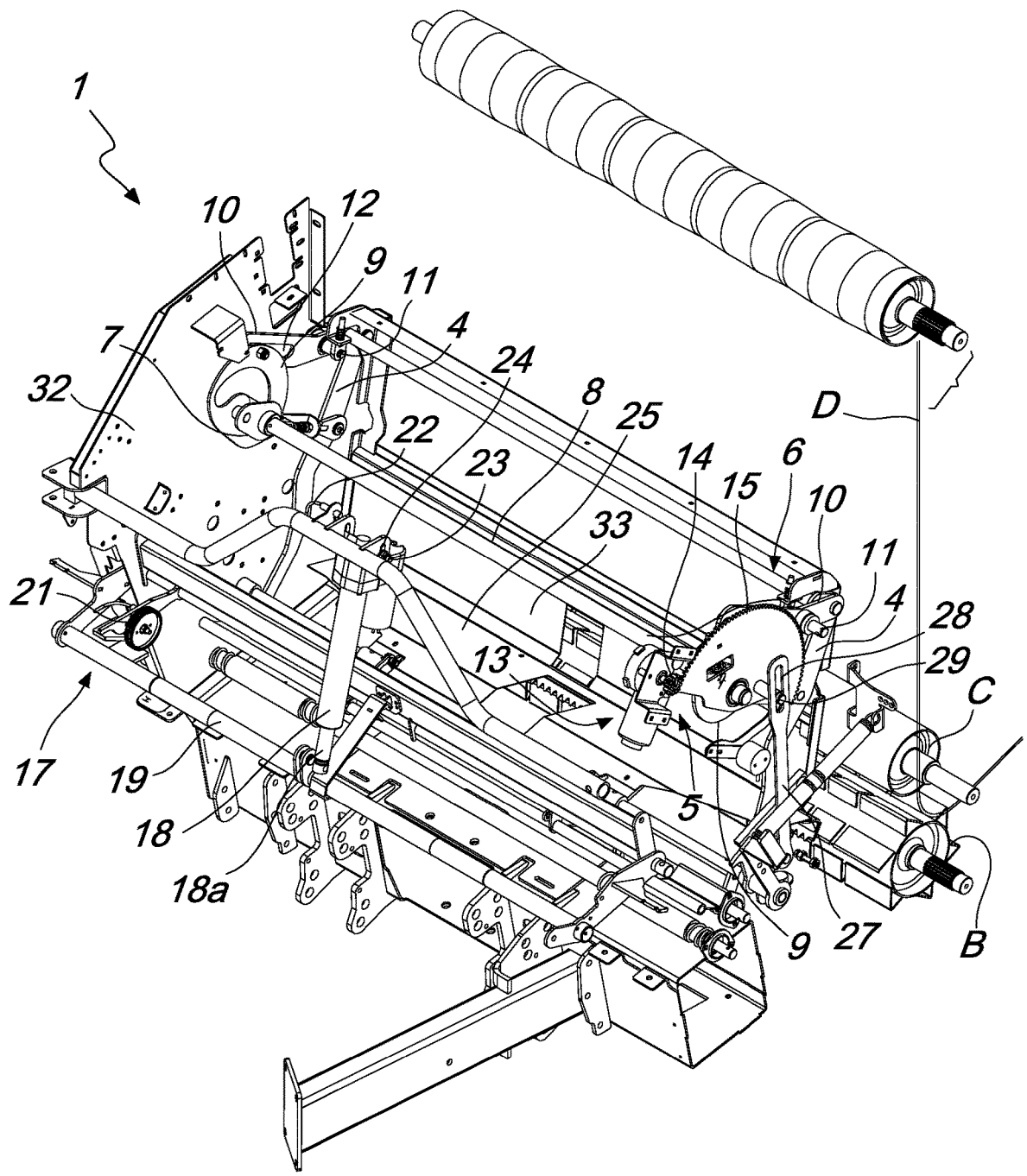
FIG. 5 is a right-hand perspective front schematic view of the apparatus according to the invention, in the first limit position of the transfer and delivery device, with the bale and a second covering element both removed.
Figure 6:
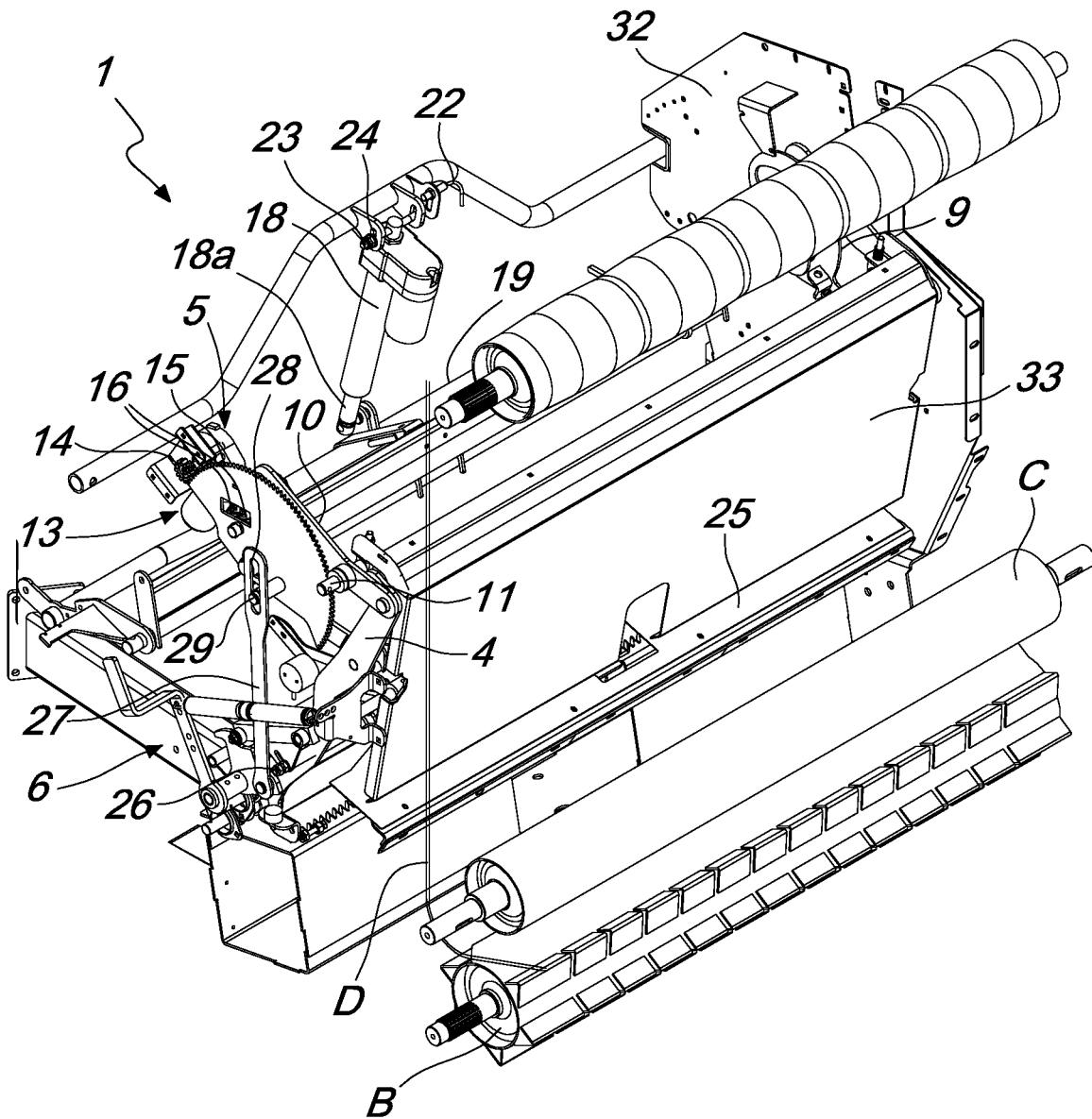
FIG. 6 is a right-hand perspective rear schematic view of the apparatus in FIG. 3, in the first limit position of the transfer and delivery device, with the bale and a first covering element both removed.
Figure 7:
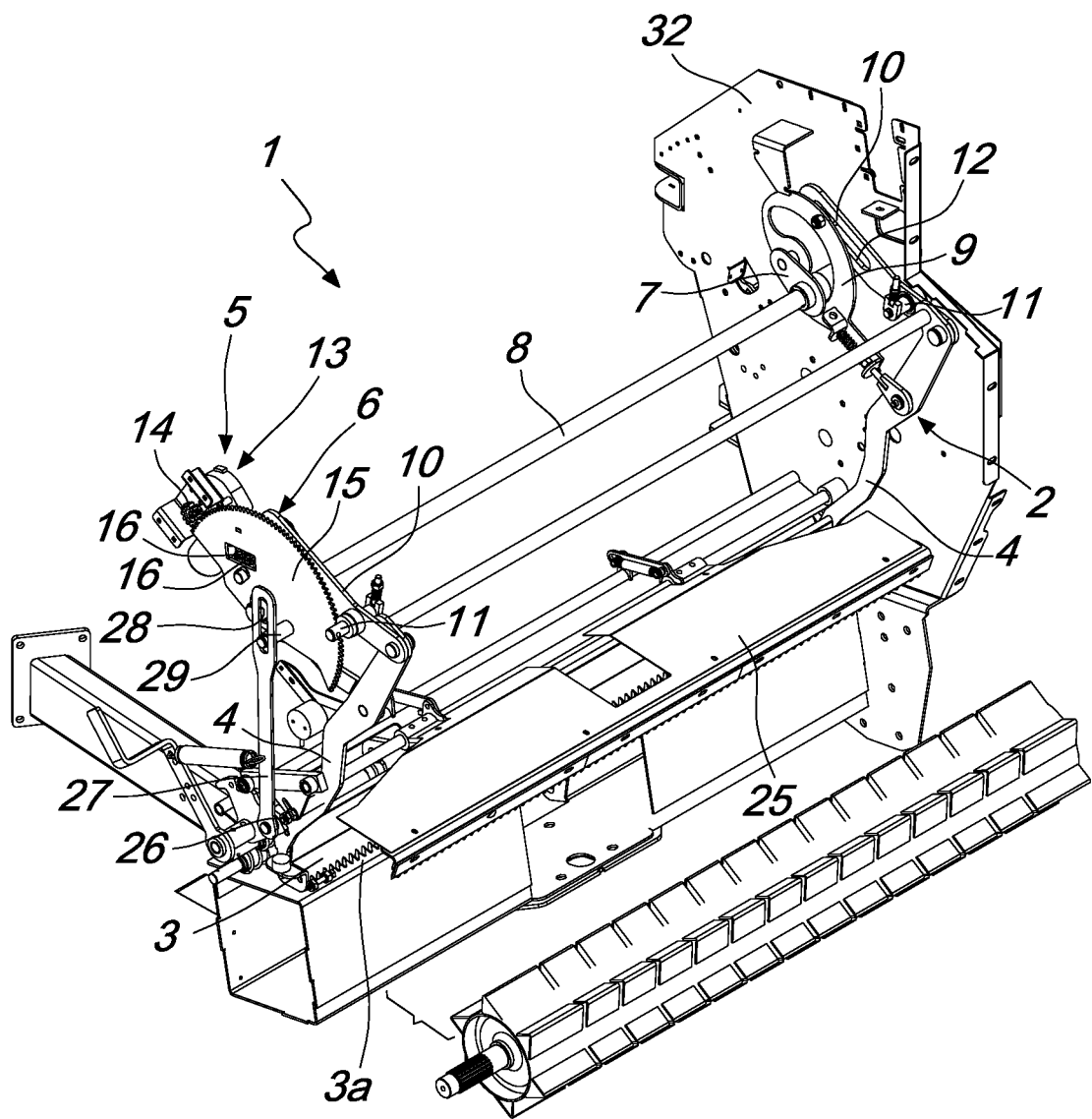
FIG. 7 is the apparatus in FIG. 6, with further components removed.
Figure 8:
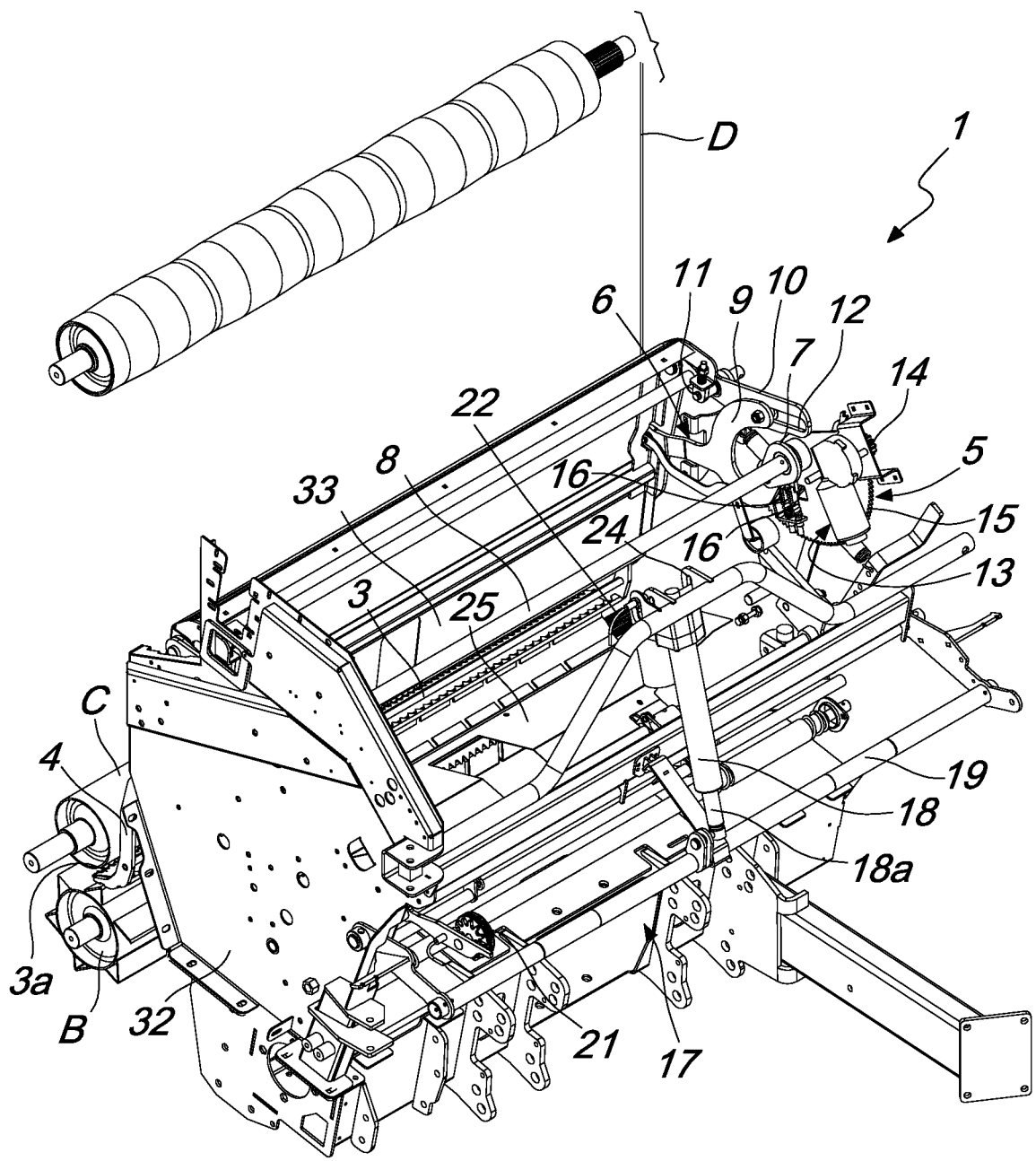
FIG. 8 is a left-hand perspective front schematic view of the apparatus according to the invention in FIG. 3, in the second limit position of the transfer and delivery device.
Figure 9:
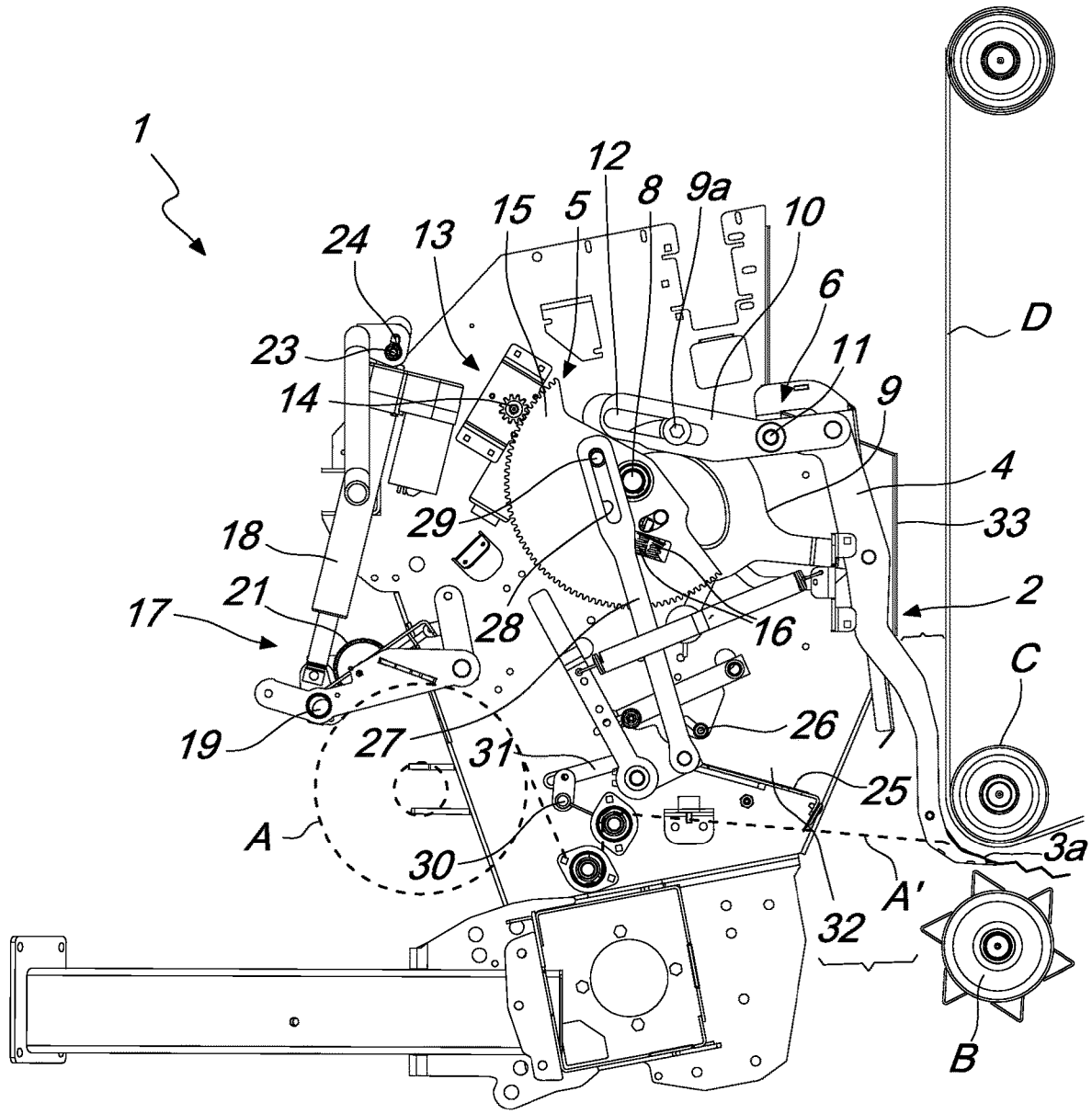
FIG. 9 is a side schematic view of the apparatus in FIG. 8.
Figure 10:
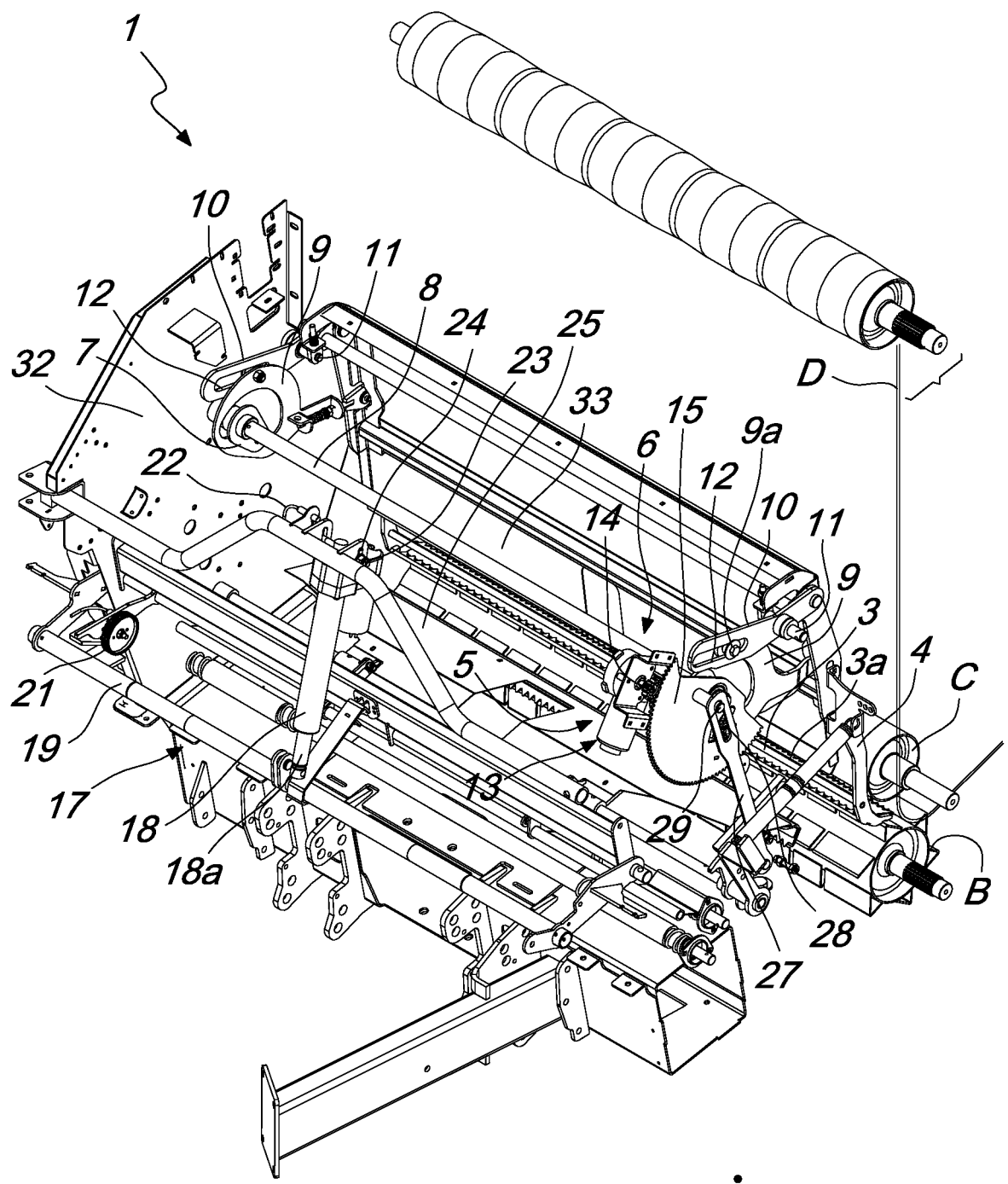
FIG. 10 is a right-hand perspective front schematic view of the apparatus in FIG. 5, in the second limit position of the transfer and delivery device.
Figure 11:
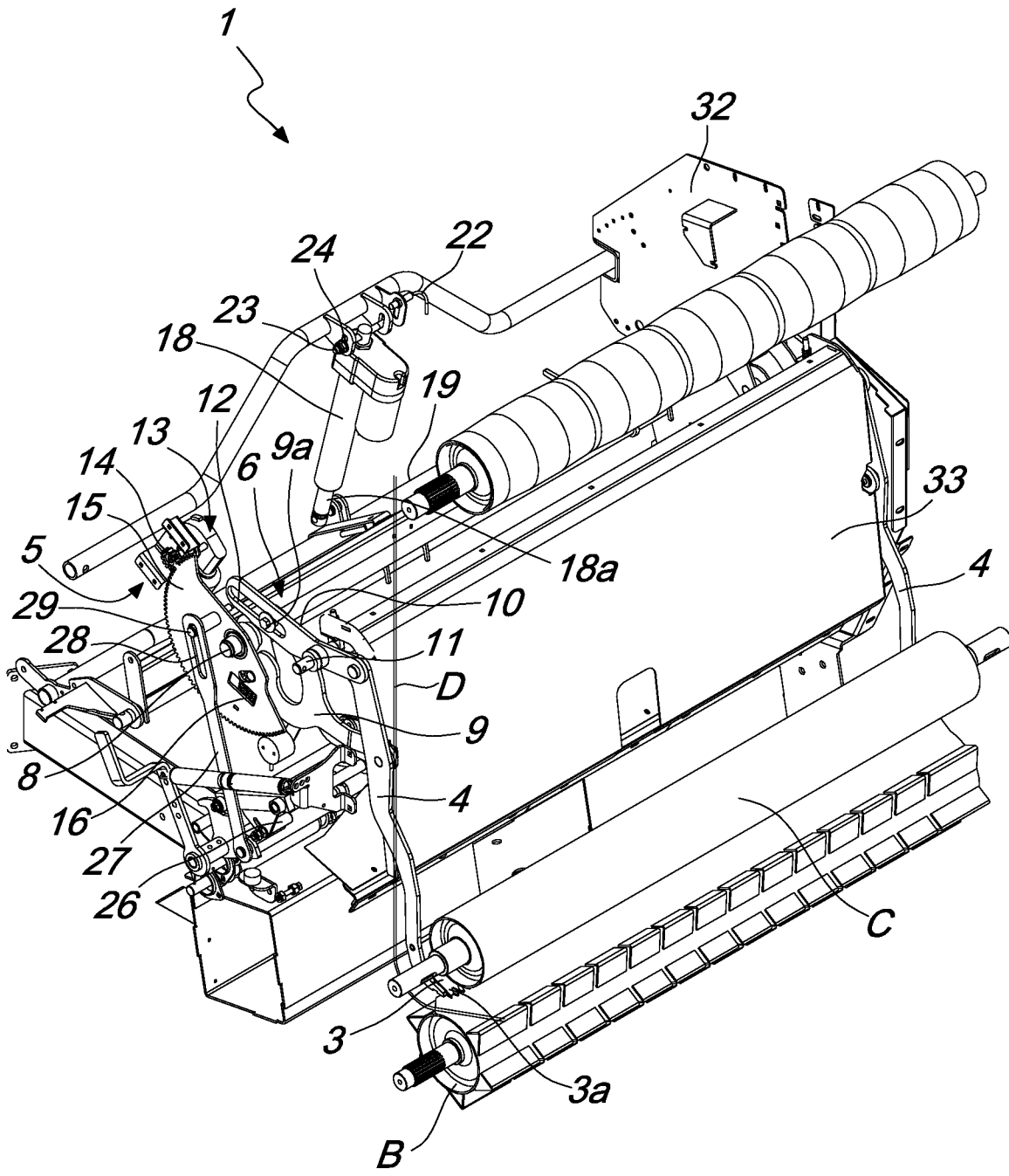
FIG. 11 is a right-hand perspective rear schematic view of the apparatus in FIG. 8, in the second limit position of the transfer and delivery device.
Figure 12:
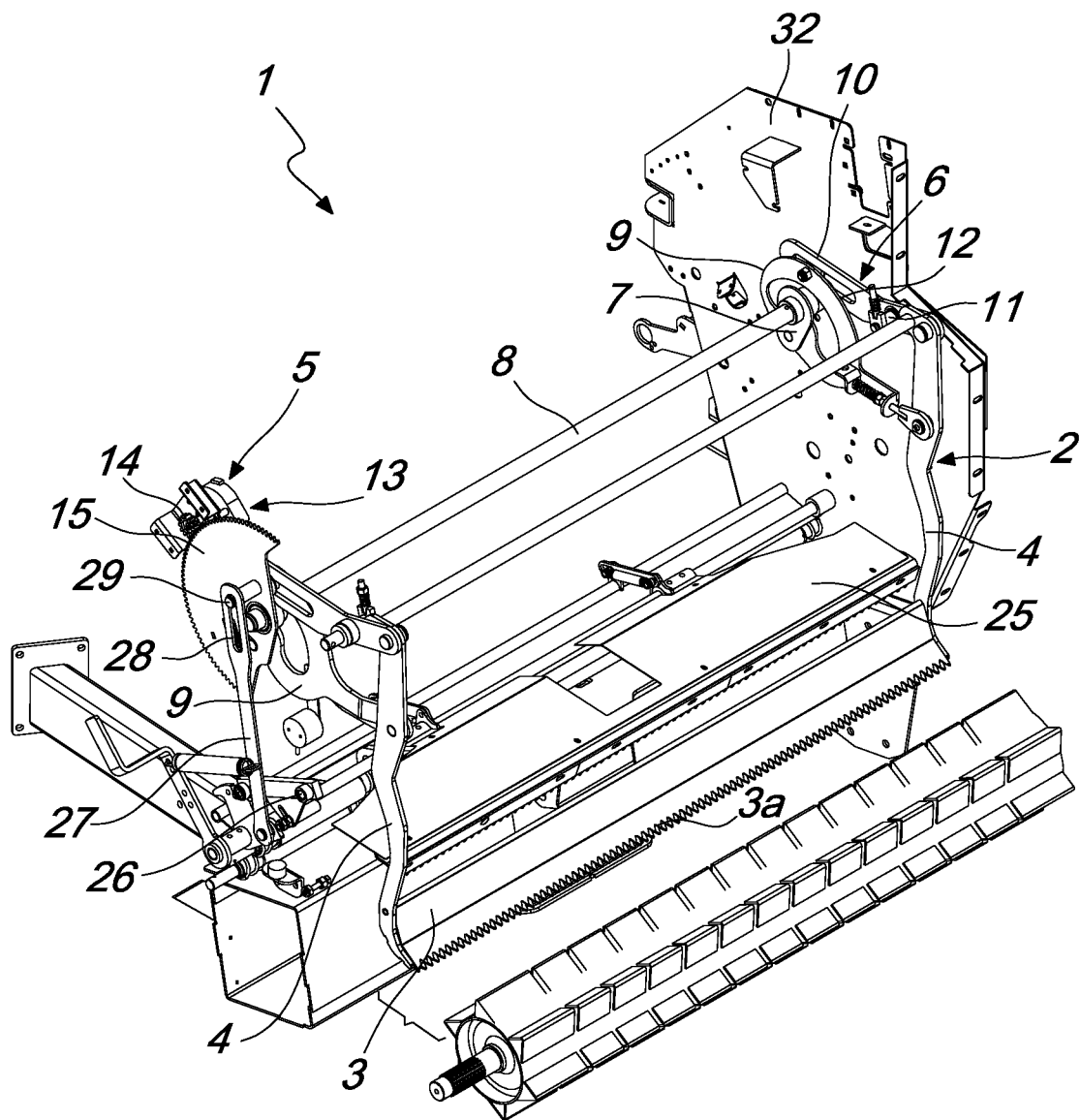
FIG. 12 is the apparatus in FIG. 11, with further components removed.

According to the invention, the apparatus 1 comprises means of movement of a device 2 for the transfer and delivery of an end flap A' of the reel A to the forming chamber. The device 2 is provided with an end blade 3 which can move along a work path, from a first limit position (in which the device 2 is shown in FIGS. 1 to 7), in which the blade 3 is proximate to the reel A supported by the structure, for withdrawing the end flap A', which in fact rests on the blade 3 (as can be seen in FIG. 4), and waiting for the right time for sending to the chamber, to a second limit position, and vice versa.

In the second limit position (in which the device 2 is shown in FIGS. 8 to 12), the blade 3 is facing toward the chamber, and thus during the transition from the first limit position to the second limit position the blade 3 can transfer and deliver, by pushing it, the flap A' to the chamber, into which it is attracted by the centrifugal forces which are due to the high rotation speed imposed on the bale.

Once the second limit position has been reached, the flap A' is attracted into the chamber by the bale, which is rotating inside the chamber (by virtue of the contact between the bale and the respective forming rollers, which are inside the chamber and on which the bale presses, a traction action is exerted on the flap A' that enables its wrapping).

As can be seen clearly from the accompanying figures, such limit positions have substantially the same height from the ground, thus ensuring a path that is substantially parallel to the ground for the blade 3 (producing the advantages which will be better explained below).

It should be noted that the possibility exists of arranging an introduction roller B, at the mouth of the forming chamber, at the second limit position assumed by the blade 3.

Upon reaching the second limit position the introduction roller B favors the transport of the end flap A' into the forming chamber.

Furthermore, facing the introduction roller B there is usually a further support roller C for belts D, which are wound around it and are designed to operate other components of the agricultural machine and of the forming chamber (or, in substitution of the support roller C, there is a crossbeam or the like).

In particular, the transfer and delivery device 2 is constituted substantially by a bracket, which comprises a pair of mutually parallel arms 4 and the blade 3, which in fact is formed by a contoured plate, which is interposed between the arms 4 and extends substantially for the entire length of the reel A (and optionally of the core, if present).

In order to allow an easier movement of the end flap A', the contoured plate that constitutes the blade 3 is conveniently curved and has a toothing along the edge 3' directed toward the forming chamber (although it should be noted that apparatuses 1 can be made which are provided with blades 3 of different shapes, and/or possibly without toothing 3a).

In an embodiment of significant practical interest, shown in the accompanying figures for the purposes of non-limiting example of the application of the invention, the movement means comprise an actuator assembly 5 of a kinematic mechanism 6, which has first of all a pair of linkages 7 keyed along a shaft 8 that oscillates about its longitudinal axis, parallel to the contoured plate defining the blade 3 and, if present, to the core for supporting the reel A.

Each linkage 7 is pivoted to a respective contoured body 9 which, at the opposite end, is coupled rotatably to a respective arm 4, so as to be able to move it (and with it, the entire device 2 and thus the blade 3) between the aforementioned limit positions, as a result of the oscillation about its longitudinal axis of the shaft 8.

Furthermore, the kinematic mechanism 6 comprises a pair of support levers 10, which oscillate about respective fixed central axes 11 (which are mutually aligned with and parallel to the shaft 8); each lever 10 is pivoted with a first end thereof to a respective arm 4 and has, at the opposite end, a guide slot 12 for a bearing 9a coupled to the body 9 (or for a wheel, or for another element capable of sliding in the slot 12), for adjusting and defining (together with the body 9 itself) the desired work path of the blade 3 (in that the position of the levers 10, and thus of the respective arms 4, depends on the position of the corresponding bearing 9a in the guide slot 12).

With further reference to the embodiment shown in the accompanying figures for the purposes of non-limiting example of the application of the invention, the actuator assembly 5 comprises a gearmotor 13, which is functionally associated with a pinion 14, which in turn meshes with a crown wheel 15 which is integral with the shaft 8 and oscillates about the longitudinal axis thereof.

It must be noted that the possibility is not excluded of providing the apparatus 1 according to the invention with actuator assemblies 5 constituted by different components, such as for example a linear actuator associated with specific means of transmission to the shaft 8.

Conveniently, the apparatus 1 comprises at least one safety spring 16, which acts on at least one respective linkage 7 (and for example one or two mutually parallel safety springs 16 with axial action, for each linkage 7), in order to absorb any shocks underwent by the blade 3 and by the device 2 and, upon the cessation of the stress owing to the shock, to ensure the subsequent restoration of the optimal configuration.

Conveniently, the apparatus 1 according to the invention comprises a braking device 17 which is normally arranged to obstruct the unwinding of the reel A supported by the structure, so as to ensure a correct positioning (and tensioning) of the net on the bale, and at the same time prevent any losses of banded material, which could occur in an unwanted manner, damaging and/or interfering with the correct operation of the other components of the apparatus 1.

The device 17 is automatically deactivatable, upon the completed formation of the bale (or in any case upon reaching a preset diameter thereof), in order to allow the unwinding of the reel A (thanks to the traction action developed by the blade 3 and more generally by the device 2) and thus the transfer and delivery of the end flap A' to the forming chamber and the triggering of the traction of the flap A' by the bale, as previously noted in the foregoing pages.

Furthermore, as soon as the speed of unwinding of the reel A increases (in that the end flap A', first entrained in the second limit position by the blade 3, is attracted by the forming chamber and by the bale rotating rapidly therein), the device 17 reactivates itself automatically, in order to brake the banded material even while the wrapping of the bale is still in progress (without such braking in fact, the banded material could be distributed unevenly around the bale, and over its whole width).

In particular, the braking device 17 comprises an actuator 18 for the movement of a cylindrical bar 19, arranged parallel with respect to the reel A supported by the structure, from a position for braking, in which the bar 19 is elastically pressed against the reel A by way of braking springs 20, in order to obstruct the unwinding of the end flap A', to a position for unwinding, in which the bar 19 is spaced apart from the reel A (in order to allow the unwinding), and vice versa.

It should be noted that the scope of protection claimed herein includes apparatuses 1 which are provided with braking devices 17 of different types, which may be adopted, in substitution of the device described above, according to specific requirements. For example, the movement actuator 18 could act on components that are directly connected to the reel A, for example on a disk brake or on a strap brake connected to the core (if present, naturally) supporting the reel A.

Furthermore, precisely in order to allow to the device 17 to reactivate itself automatically when an increase occurs in the unwinding speed of the reel A, such braking device 17 comprises a revolution counter roller 21, which is in parallel with and abuts against the reel A: when, upon the entry of the end flap A' into the forming chamber, the bale begins to entrain the flap A' inside the chamber itself, the revolution counter roller 21 is capable of detecting the consequent increase in unwinding speed.

The revolution counter roller 21 is thus functionally associated with the movement actuator 18 for sending the latter information corresponding to the increase in speed, so that the actuator 18 can return the bar 19 to abutment against the reel A and thus obtain, as desired, the consequent automatic reactivation of the braking device 17.

Positively, the braking device 17 also comprises a sensor 22 of the position of the movement actuator 18, which is supported by at least one support pin 23 which can move in a slot 24, so as to control the stroke of the movable pusher 18a of the actuator 18, during the transition from the position for braking to the position for unwinding, and vice versa.

The choice to support the actuator 18 with a support pin 23 which can move in a slot 24 (instead of being fixed), and to arrange a sensor 22 that can thus detect the movements of the actuator 18, makes it possible to have an effective reference, in order to know, at each cycle, the position and the movements of the actuator 18 (and for example the moment when the actuator 18 begins moving the bar 19 from the position for braking to the position for unwinding, and vice versa). By suitably calculating the times and extents of the movements that it is desired to impose on the movable pusher 18a, it is thus possible to control the stroke at will, and more generally this makes it possible to monitor with precision the movements of the bar 19 and of the braking device 17.

More precisely, in a possible mode of actuation of the (non-limiting) control, the position sensor 22 can detect the position of a support pin 23, which can move in a slot 24 and is rigidly coupled to the end of the actuator 18 (and, more precisely, of the cylinder in which the pusher 18a slides).

The presence of the sensor 22 makes it possible to ensure the maximum reactivity of the bar 19 in the transition from the position for braking to the position for unwinding, and vice versa, by containing the extent of the stroke of the actuator 18 during the transition from the position for braking to the position for unwinding.

In fact, in the position for braking, the movable pusher 18a is pressed against the reel A while, at the opposite end, the above mentioned end of the cylinder, and thus the support pin 23, are facing the sensor 22, which detects their presence.

In order to command the raising of the bar 19 from the reel A in order to allow the unwinding, the movable pusher 18a is partially introduced into the cylinder, for a preset stroke (corresponding to a predetermined sliding time), thus reducing the overall length of the actuator 18. In the first part of the stroke, this causes the descent of the support pin 23 in the slot 24, which thus loses the alignment with the sensor 22, while in the second part of the stroke, the pusher 18a goes back up again and thus we have the desired transition to the position for unwinding.

Thus by maintaining a sufficiently short preset time (and/or a sufficiently short predefined stroke), from the moment when the sensor 22 detects the movement of the support pin 23, it is possible to obtain, thanks to the sensor 22, a limited stroke, such as to ensure the unwinding of the reel A, but at the same time sufficiently contained as to allow a rapid restoration of the position for braking and thus the maximum reactivity of the device 17.

The presence of the sensor 22 also ensures that information about the correct braking of the reel A is available at all times, in that in such arrangement the sensor 22 detects the presence of the support pin 23.

It should be noted furthermore that the possibility also exists of actuating the braking device 17 by way of a button, which can be used by an operator and which is functionally associated with the movement actuator 18 (or in any case with the bar 19). When it becomes necessary to place a new reel A on the supporting structure (upon the exhaustion of the previous reel), the operator can press the button, and thus command the movement actuator 18 to lift the cylindrical bar 19, in order to allow the substitution of the reel A; subsequently, after having installed the new reel A, the operator can press the button again, in order to command the bar 19 to return to the position for braking. Thus thanks to the button, the operator can carry out the above mentioned operations in a practical and easy manner, without being forced to manually move the bar 19.

Advantageously, the apparatus 1 comprises a cutter 25, which is automatically activated upon the unwinding of a preset quantity of banded material from the reel A, in order to cut the unwound banded material.

In particular, the kinematic mechanism 6 comprises at least one release pin 26, which is automatically actuated by the transfer and delivery device 2 upon the unwinding of the preset quantity of banded material from the reel A, during the transition of the blade 3 from the second limit position to the first limit position.

The actuation of the release pin 26 determines the movement of the cutter 25, which is lowered thus cutting the unwound banded material (so as to leave free a new end flap A', for example of the length of 15 cm, available for a new cycle).

Furthermore, the kinematic mechanism 6 comprises at least one traction member 27, which is pivoted at a first end portion to the cutter 25, and has at the opposite end a guide slot 28 for a cylindrical support pin 29 protruding from the crown wheel 15.

During the transition from the first limit position to the second limit position the support pin 29 slides along the slot 28 so as to rearm the cutter 25 by way of the traction member 27, arranging it in the wait configuration, from which, as has previously been seen, it is capable of being lowered in order to cut the banded material, as soon as the release pin 26 is activated.

Advantageously, the apparatus 1 according to the invention also comprises a control brake 30 of the banded material unwound from the reel A, which is automatically actuated upon the cut executed by the cutter 25.

During the cutting step in fact, the cutter 25 descends rapidly penetrating the net (if this is what constitutes the banded material, obviously), which is formed by wires of differing thickness; at the same time, the reel A is rotating at high speed and so during the cut it does not stop immediately and this involves the danger that the thinner cables, which are still in traction because they tend to break later, will increase the length of the flap of net A' that remains unwound after the cut.

The control brake 30 guards against such risk, making it in fact possible to control the unwinding speed and thus prevent the thinner cables (instead of being cut) from breaking under the action exerted by the bale and the cutter 25 which tends to block the net.

The control brake 30, which is actuated only as a consequence of the motion of the cutter 25, counteracts the traction of the thin cables and is furthermore stable in the event of jumps of the cutter 25 in that it is connected with slotted link rods 31. The presence of the control brake 30 ensures a flap A' of length that is constant for the different types and diameters of net, guarding against the danger, owing to wind, that a flap A' of net that is too long could be introduced into the chamber, thus causing tying to be performed too early.

Conveniently, the apparatus 1 can comprise an assembly for tying the bale by way of at least one twine, which overhangs the control brake 30: such tying assembly (independent of the device 2), can for example comprise respective rotating profiled elements in the area comprised between the arms 4, in order to bring the twine proximate to the forming chamber.

Note that the kinematic mechanism 6 makes it possible to contain the height of the region intended for the passage of the banded material and for the corresponding cutter 25: the kinematic mechanism 6 in fact, as can be seen from the description on the previous pages and from the analysis in the accompanying Figures, is substantially arranged against side walls 32 covering the apparatus 1 according to the invention, and thus does not interfere with the area where the banded material passes, in which the tying assembly can thus effectively be arranged and operate, thus ensuring an optimal containment of the overall encumbrances.

The apparatus 1 according to the invention furthermore comprises a screen 33 for the protection of the chamber, which is elastically supported by the kinematic mechanism 6: the screen 33 (a conveniently shaped sheet of metal for example) prevents the apparatus 1 from becoming clogged with the agricultural products gathered by the agricultural machine and which are compressed in the chamber for forming the bale.

Thanks to the choice to attach the screen 33 to the kinematic mechanism 6, when the blade 3 moves toward the second limit position, the screen 33 also moves toward the bale, earlier with respect to the blade 3, thus limiting the rising action of the wind, which otherwise could prevent the end flap A' from being introduced correctly into the chamber.

The elastic support of the screen 33, which is obtained for example thanks to supporting springs, furthermore makes it possible for the blade 3 to be brought toward the second limit position even if the presence of some agricultural products obstructs the movement of the screen 33.

The subject matter of the present discussion is thus also an agricultural machine (for example a baler) that comprises a chamber for forming a substantially cylindrical bale and an apparatus 1 for processing bales, of the type described in the previous pages.

The operation of the apparatus according to the invention is the following.

Thanks to the apparatus 1, it is possible to wrap a bale, obtained inside a forming chamber, with a banded material (net, polymeric film, or the like), which is wound around itself on a core (or in any case supported by an adapted structure), so as to form a reel A.

During the formation of the bale, the blade 3 of the transfer and delivery device 2 is proximate to the reel A, waiting for the preset diameter of the bale to be reached (note that holding the blade 3 proximate to the reel A guards against the danger that, by virtue of the wind, the end flap A' might be prematurely attracted toward the forming chamber, causing an early wrapping).

Upon reaching a preset diameter of the bale, the braking device 17 is deactivated (thus lifting the bar 19 by means of the actuator 18), and the blade 3 is moved from the first limit position to the second limit position, driving the end flap A' of the reel A up to the mouth of the forming chamber, from where the flap A' can then be attracted, by virtue of the rotation of the bale inside the chamber.

The preset diameter, at which the braking device 17 is deactivated, can for example correspond to 90% of the diameter that the bale, once completely formed, has to reach (objective value). In this manner in fact, the blade 3 can begin to move toward the second limit position, and stop proximate to it, while waiting for the bale to be completely formed (diameter equal to 100% of the objective value), at which point it can be brought to the second limit position, for a faster and prompter introduction.

The movement of the blade 3, and of the delivery device 2, is ensured by the actuator assembly 5 and by the kinematic mechanism 6, which confers the desired work path on the blade 3.

As has been seen, as soon as the end flap A', pushed proximate to the chamber by the blade 3, 1s attracted by the chamber, the revolution counter roller 21 detects the increase in unwinding speed and commands the re-lowering of the bar 19, which again brakes the reel A, even while the subsequent unwinding is in progress.

Furthermore, again thanks to the actuator assembly 5 and to the kinematic mechanism 6, the blade 3 retreats, after having delivered the flap A', returning to the first limit position.

During the return to the first limit position, the blade 3 and the device 2 actuate the release pin 26, which causes the descent of the cutter 25 and the cutting of the banded material (naturally, by way of an adapted dimensioning, it is possible to have the cutting occur when the quantity of banded material necessary for the complete wrapping of the bale has been unwound from the reel A).

Thanks to the simple use of a transfer and delivery device 2, equipped with the respective blade 3, it is thus possible to perform the movement of the end flap A', without having to resort to specially provided rubberized rollers, as occurs with conventional solutions, while still ensuring a practical and effective wrapping of the bale.

Furthermore, thanks to the choice to use a work path in which the limit positions have substantially the same height from the ground, it is possible to provide an apparatus 1 that is capable of wrapping the bale with an ergonomic solution, of practical use for the operator.

In fact, it should be noted that during normal operation, the operator on average has to replace the reel A every hundred cycles of bale formation, and thus several times a day.

By ensuring a work path that is substantially parallel to the ground, or in any case with the limit positions having substantially the same height from the ground (thanks to the specific kinematic mechanism 6 chosen, which ensures the movement of the blade 3 thanks to the combined action of the bodies 9 and of the levers 10, which are both actuated by the shaft 8 and thus by the gearmotor 13), it is possible to maintain the core (or other support structure), and therefore the reel A, at a low vertical height, thus favoring operations to replace the reel A (which can reach a weight of over 25 kg).

Furthermore, the adoption of the substantially horizontal work path described above also ensures considerable advantages in relation to the introduction of the end flap A' into the chamber, and thus to the movement performed by the blade 3 at and proximate to the second limit position.

In fact, by travelling a substantially horizontal portion, the blade 3 can easily be introduced between the introduction roller B and the support roller C (being maintained near the introduction roller B, given that the support roller C, with its motion, opposes the entry of the blade 3), without interfering with them and without risking collisions (for the same purpose, it is also possible, while remaining within the scope of protection claimed herein, to structure the kinematic mechanism 6 in such a way that the end portion of the blade 3, at the second limit position, approximates an arc of a circle having the same curvature as the introduction roller B).

This would not be possible by providing for the simple hinging about a fixed point of the device 2.

It should furthermore be noted that in addition to the blade 3, the movement of the cutter 25 (and the subsequent rearming) and of the screen 33 are also commanded by the same kinematic mechanism 6, thus ensuring maximum structural simplicity.

Lastly, it should be emphasized that the solution adopted ensures encumbrances are contained, thanks to the compaction of components and to the choice to use a kinematic mechanism 6 (which is responsible, as has been seen, for the movements), arranged against the walls 32 and in any case arranged at a greater height from the ground than that at which the net and/or the tying assembly can be positioned. This makes it possible, in fact, to also install a tying assembly, the profiled elements of which can in turn be easily inserted between the introduction roller B and the support roller C, in that the heights of the pivoting points about which they can be hinged are kept limited.

In practice it has been found that the apparatus and the machine according to the invention fully achieve the set aim and objects, in that the use of means of movement of a device for the transfer and delivery of an end flap of the reel to the forming chamber, provided with an end blade that can move between limit positions which have substantially the same height from the ground, makes it possible to provide an apparatus that is capable of ensuring a practical and effective wrapping of the bale.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

What is claimed is:

1. An apparatus for processing bales, for agricultural machines provided with a forming chamber for forming a cylindrical bale, the apparatus comprising:
   a structure for supporting a reel of banded material, designed to wrap the bale;
   a device configured for transferring and delivering an end flap of the reel to the forming chamber, said device being provided with an end blade which moves along a work path from a first limit position, in which the blade is proximate to the reel for the withdrawal of the end flap, to a second limit position, in which said blade faces toward the forming chamber, for the delivery of the flap to the chamber, and vice versa,
   wherein the work path includes a rotation component and a translation component for the blade, relative to the forming chamber,
   wherein the device includes a cam mechanism and wherein the cam mechanism includes a guide slot and a bearing which slides into the guide slot.

2. The apparatus of claim 1, wherein the device includes a pair of four-bar-link mechanisms.

3. The apparatus of claim 2, wherein the device includes a pair of mutually parallel arms, which are connected to the end blade and constitute respective links of the pair of four-bar-link mechanisms.

4. The apparatus of claim 1, wherein the first and second limit positions have substantially the same height from the ground and wherein the work path is substantially parallel to the ground.

5. The apparatus of claim 1, comprising
an actuator, which includes a first part and a second part, wherein the second part is connected to a brake activable on the reel and is movable away from the first part to advance the brake towards the reel, wherein the first part of the actuator is movably coupled to the structure;
a sensor, responsive to a movement of the first part of the actuator with respect to the structure.

6. The apparatus of claim 5, wherein the brake includes a cylindrical bar, arranged parallel with respect to said reel.

7. The apparatus of claim 6, wherein the second part is connected to the cylindrical bar for moving the cylindrical bar between a braking position, in which the cylindrical bar is pressed against the reel, and an unwinding position, in which said cylindrical bar is spaced apart from said reel.

8. The apparatus of claim 5, comprising a plurality of breaking springs configured for pressing the brake against the reel.

9. The apparatus of claim 5, comprising a revolution counter roller, which abuts against the reel for reading a speed of unwinding of the reel, said revolution counter roller being associated with said actuator, for sending an information corresponding to the speed of unwinding of the reel to said actuator for controlling an activation of the brake.

10. The apparatus of claim 5, wherein the first part of the actuator starts moving away from the reel, as the brake contacts the reel, thus activating the sensor.

11. The apparatus of claim 10, wherein the structure includes a slit and the first part includes at least one support pin, movable in the slit for controlling the second part by activating the sensor.

12. The apparatus of claim 11, wherein the actuator is a cylinder-piston actuator wherein the first part includes a cylinder and the second part includes a piston, sliding into the cylinder.

13. An apparatus for processing bales, for agricultural machines provided with a forming chamber for forming a cylindrical bale, the apparatus comprising:
a structure for supporting a reel of banded material, designed to wrap the bale;
a device configured for transferring and delivering an end flap of the reel to the forming chamber, said device being provided with an end blade which moves along a work path from a first limit position, in which the blade is proximate to the reel for the withdrawal of the end flap, to a second limit position, in which said blade faces toward the forming chamber, for the delivery of the flap to the chamber, and vice versa,
wherein the work path includes a rotation component and a translation component for the blade, relative to the forming chamber,
and wherein the apparatus further comprises:
an actuator, which includes a first part and a second part, wherein the second part is connected to a brake activable on the reel and is movable away from the first part to advance the brake towards the reel, wherein the first part of the actuator is movably coupled to the structure;
a sensor, responsive to a movement of the first part of the actuator with respect to the structure.

14. An apparatus for processing bales, for agricultural machines provided with a forming chamber for forming a cylindrical bale, the apparatus comprising:
a structure for supporting a reel of banded material, designed to wrap the bale;
a device configured for transferring and delivering an end flap of the reel to the forming chamber, said device being provided with an end blade which moves along a work path from a first limit position, in which the blade is proximate to the reel for the withdrawal of the end flap, to a second limit position, in which said blade faces toward the forming chamber, for the delivery of the flap to the chamber, and vice versa;
an actuator, which includes a first part and a second part, wherein the second part is connected to a brake activable on the reel and is movable away from the first part to advance the brake towards the reel, wherein the first part of the actuator is movably coupled to the structure;
a sensor, responsive to a movement of the first part of the actuator with respect to the structure.

15. The apparatus of claim 14, wherein the first part of the actuator starts moving away from the reel, as the brake contacts the reel, thus activating the sensor.

16. The apparatus of claim 15, wherein the structure includes a slit and the first part includes at least one support pin, movable in the slit for controlling the second part by activating the sensor.

17. The apparatus of claim 16, wherein the actuator is a cylinder-piston actuator wherein the first part includes a cylinder and the second part includes a piston, sliding into the cylinder.

18. The apparatus of claim 14, wherein the brake includes a cylindrical bar, arranged parallel with respect to said reel.

19. The apparatus of claim 18, wherein the second part is connected to the cylindrical bar for moving the cylindrical bar between a braking position, in which the cylindrical bar is pressed against the reel, and an unwinding position, in which said cylindrical bar is spaced apart from said reel.

* * * * *